United States Patent [19]

Miller et al.

[11] Patent Number: 5,780,151
[45] Date of Patent: Jul. 14, 1998

[54] RADIATION CROSSLINKABLE BRANCHED POLYESTER COMPOSITIONS WHICH ARE WATER-DISPERSIBLE AND PROCESSES

[75] Inventors: Richard Anthony Miller; Scott Ellery George, both of Kingsport, Tenn.

[73] Assignee: Eastman Chemical Company, Kingsport, Tenn.

[21] Appl. No.: 569,638

[22] Filed: Dec. 8, 1995

[51] Int. Cl.$^6$ ............................................. C09J 7/02
[52] U.S. Cl. .................. 428/355 R; 528/277; 528/279; 528/288; 528/291; 528/293; 528/295; 427/207.1
[58] Field of Search .................. 428/355, 355 R; 528/277, 279, 288, 291, 293, 295; 427/207.1

[56] References Cited

U.S. PATENT DOCUMENTS 4,073,777  2/1978  O'Neill et al. .
5,543,488  8/1996  Miller .................................. 528/277

FOREIGN PATENT DOCUMENTS 0 574 776 A  12/1993  European Pat. Off. .
WO 95/18191 A  7/1995  WIPO .

*Primary Examiner*—Jenna Davis
*Attorney, Agent, or Firm*—Harry J. Gwinnell; Mark A. Montgomery

[57] ABSTRACT

Disclosed is a radiation crosslinkable water-dispersible adhesive composition that is useful in forming paper and plastic articles and other products that can be recycled through a process which includes washing or repulping in aqueous media. The cross-linkable water-dispersible adhesive composition is preferably used as a hot melt adhesive. The cross-linkable water-dispersible adhesive composition is a low molecular weight, branched copolyester containing a sulfomonomer and unsaturated moieties. The radiation crosslinked adhesive composition has more cohesive strength and viscosity than its corresponding uncross-linked adhesive, yet is still water-dispersible during product recycling.

25 Claims, No Drawings

RADIATION CROSSLINKABLE BRANCHED POLYESTER COMPOSITIONS WHICH ARE WATER-DISPERSIBLE AND PROCESSES

FIELD OF THE INVENTION

The present invention is directed to a water-dispersible adhesive polyester composition. More particularly, the present invention is directed to a radiation crosslinkable adhesive polyester composition which is water-dispersible, even after radiation curing.

BACKGROUND OF THE INVENTION

Many adhesives including water-dispersible adhesives which can be applied to substrates as hot melts or in aqueous dispersions are useful for bonding various substrates together such as wood, paper, plastics, and textiles, as well as other materials. Water dispersible adhesives can be applied as a hot polymer melt or as an aqueous or other solvent dispersion. A hot melt adhesive must cool to "set" while the solvent must evaporate for a dispersion to "set." It is preferable in the adhesives industry to apply adhesive compositions to a substrate by using hot melt application methods because hot melt coatings eliminate the need for hazardous solvents as well as the drying time needed for water-base adhesives. Hot melt adhesives, useful for producing corrugated paper board, must have high bond strength under conditions of shock, stress, high humidity, and extremes of temperature encountered in transportation and storage, in addition to the amount of adhesive strength required for different types of applications. In addition, the melt point, wetting time, initial tack, setting time, pot life, and general handling qualities on automatic machinery are essential considerations.

For the manufacture of some products, an adhesive having an especially strong cohesion or holding power is needed. For example, heavy duty duct tape requires more cohesive integrity than does standard masking tape. Other products which require extra strong cohesive bonding include extra heavy corrugated boxes, polyethylene/paper board laminates and paper bags that have polyethylene liners such as the new bags for dry pet food. In contrast to "cohesion," "adhesion" is the sticky or tacky property of an adhesive which allows it to bond substrates together, regardless of how strong the cohesive holding power.

In addition to the required bonding strength, it is typically necessary for a polymer adhesive to have a relatively low melt viscosity so that the adhesive can be applied to a substrate in a smooth, thin layer. Melt viscosities are a result of the size of the polymer molecule. The higher the molecular weight of a polymer, the more viscous the polymer will be upon melting. Higher molecular weight polymers also yield more viscous dispersions. Due to the equipment used in industrial hot melt applications, it is typically required that the adhesive have a viscosity between about 40,000 and 60,000 centipoises (cps) at 177° C.

In order to give more cohesive strength to an adhesive composition, it is common to add additives to build up the molecular weight of the adhesive composition. Examples of additives which can increase cohesive strength include elastomeric polymers, styrenic block copolymers, resins that act as tackifiers and fillers such as calcium carbonate, in small amounts. However, it can be difficult to increase strength with additives due to incompatibility between some adhesive components and certain additives. Extra cohesive strength can also be gained by crosslinking or curing the adhesive polymers. A single component crosslinked composition has a higher molecular weight and therefore might eliminate the need for additives to gain cohesive strength. Crosslinking polymers together provides more tensile strength, stability and flexibility.

Still another desire in the current adhesives industry is for the adhesive used to bind otherwise recyclable products to be dispersible and completely removable from the fibers of paper, paper products, plastics and other disposable products to conserve more material resources and to avoid large additions to landfill space. The use of polyolefin hot melt adhesives to close or seal cartons made from corrugated material has presented problems in regard to repulpability of the used boxes or cartons (see U.S. Pat. Nos. 4,070,316; 4,127,619; 4,146,521; 4,460,728; 4,471,086; and 4,886,853). All hot melt adhesives used in industry are largely water insoluble and impossible to disperse during the repulping process. This fact makes certain paper products, in which adhesives are necessarily utilized, unattractive since failure to disperse the insoluble adhesives results in lower quality recycled paper having variable composition and nonuniformity and thus, lower product value. It is thus a general practice in the paper industry to recover only the portion of the used and waste corrugated material which does not contain significant amounts of adhesive in order to repulp the waste material for use in the preparation of other useful materials such as cardboard.

"Repulpable" as used herein refers to the ability of an adhesive, as an integral part of an article of manufacture, to be dispersed in water or other aqueous solvent during a repulping or other recycling process so that the adhesive is separated from the substrate fibers, regardless of whether the recycled article involves paper, plastics or other materials. In paper or cardboard to plastic laminates, the paper and plastic materials must be separated prior to their respective recycling processes. Likewise, adhesives also hinder the recycling of various plastics. In the recycling of plastics such as PET, nondispersed adhesives create char and contamination in the recycling melt phase.

U.S. Pat. No. 5,543,488, incorporated herein in its entirety, discloses a branched water-dispersible polyester hot melt adhesive composition which is repulpable due to its water-soluble characteristics. However, the disclosed branched composition is not as useful in applications which require an adhesive having especially high cohesive strength.

For high strength laminates such as heavy duty duct tape or electrical tape, it would be desirable to have a hot melt adhesive which has a short set time, low temperature sensitivity, high substrate compatibility, stability on storage, high shear strength, high tensile strength, low viscosity for easy coatability onto a substrate, and high cold flow resistance, in addition to being repulpable. Such an adhesive composition could be easily and evenly applied to most substrates as a lower viscosity hot melt or dispersion, yet produce an adhesive coating having high cohesive bonding strength and durability while being repulpable.

SUMMARY OF THE INVENTION

The water-dispersible adhesive composition according to the present invention comprises a branched water-dispersible radiation crosslinkable polyester composition made of the residues or moieties of reaction products;

(I) at least one difunctional dicarboxylic acid which is not a sulfomonomer;

(II) about 2 to 30 mole percent, based on the total of all acid, hydroxyl and amino equivalence, of residues of at least one difunctional sulfomonomer containing at least one sulfonate group bonded to an aromatic ring wherein the functional groups are hydroxyl or carboxyl;

(III) at least one diol or a mixture of diol and diamine comprising:

(A) about 0.1 to 85 mole percent, based on the total mole percent of diol moieties or diol and diamine moieties, of a diol or diamine having the formula H(—OCH$_2$CH$_2$—)$_n$OH and HRN(—CH$_2$CH$_2$O—))$_n$NHR wherein n is 2 to about 20 and R is hydrogen or C$_1$–C$_6$ alkyl provided that the mole percent of such moieties is inversely proportional to the value of n;

(B) about 0.1 to about 15 mole percent, based on the total mole percent of diol moieties or diol and diamine moieties, of moieties of a poly(ethylene glycol) having the formula H(—OCH$_2$CH$_2$—)$_n$OH wherein n is 2 to about 500, provided that the mole percent of such moieties is inversely proportional to the value of n; and (C) 0 to about 99 mole percent of the diol component or diol and diamine mixture being selected from the group consisting of a glycol containing two —C(R$^1$)$_2$—OH groups wherein R$^1$ in the reactant is a hydrogen atom, an alkyl of 1 to 5 carbon atoms, or an aryl group of 6 to 10 carbon atoms;

(IV) 0 to about 40 mole percent of a difunctional monomer reactant selected from the group consisting of hydroxycarboxylic acids having one —C(R—)$_2$—OH group, aminocarboxylic acids having one —NRH group, and mixtures of said difunctional reactants wherein R in the reactant is hydrogen or an alkyl group of 1 to 6 carbon atoms;

(V) about 0.1 to 40 mole percent of a "multifunctional" or "branch inducing" reactant containing at least three functional groups selected from hydroxyl, carboxyl, amino and mixtures thereof; and (VI) about 0.1 to 20 mole percent of an unsaturated mono- or dicarboxylic acid;

wherein the moieties of (I), (II), (III), (IV) and (V) are aliphatic, cycloaliphatic or aromatic, wherein the polymer contains substantially equal molar proportions of acid equivalents (100 mole percent) and diol or diol and diamine equivalents (100 mole percent), wherein all stated mole percents are based on the total of all acid, hydroxyl, and amino group containing reactants being equal to 200 mole percent, and wherein the polymer contains a portion of the acid-group containing reactants (100 mole percent acid) to hydroxyl and amino-group containing reactants (100 mole percent), wherein at least 20 weight percent of the groups linking the moieties of the monomeric units are ester linkages, wherein the inherent viscosity is at least 0.1 dL/g measured in a 60/40 parts by weight solution of phenol/tetrachloroethane at 25° C. and at a concentration of about 0.25 g of polymer in 100 ml of the solvent, wherein the glass transition temperature $T_g$ is no greater than 20° C., and wherein the ring and ball softening point (RBSP) is at least 70° C.

This invention also comprises applying the above water-dispersible adhesive composition in liquid form to at least one surface of a substrate and thereafter irradiating the adhesive layer with ultraviolet radiation. This forms a crosslinked pressure-sensitive adhesive article such as a tape, sticker, bumper sticker or adhesive bandage. The crosslinked adhesive can later be separated from the substrate during recycling by dispersing the crosslinked adhesive in an aqueous recycling or repulping solution.

The present invention also further comprises applying the above water-dispersible adhesive composition in liquid form to a surface of a substrate and, while remaining in the liquid form, applying a second surface of a substrate to the water-dispersible adhesive composition, wherein at least one of the substrates is permeable to UV radiation, and thereafter treating the combination with ultraviolet radiation, thereby forming an article of manufacture that comprises the crosslinked water-dispersible adhesive composition laminated between two substrates or two surfaces of a substrate. Alternatively, the second substrate can be applied even after crosslinking due to the pressure sensitivity of the adhesive. The crosslinked adhesive can later be separated from the substrates during recycling by dispersing the crosslinked adhesive in an aqueous recycling or repulping solution.

The present invention also comprises the laminated articles of manufacture having the crosslinked adhesive composition either between two substrates such as in corrugated board and polyethylene/paper board laminates or on at least one side of a substrate forming a pressure-sensitive adhesive article.

DETAILED DESCRIPTION OF THE INVENTION

The applicants have unexpectedly discovered an improved adhesive composition that can easily be applied as a liquid dispersion (aqueous or solvent) on substrates as well as by hot melt application. The inventive adhesive composition not only has good adhesive properties but also has exceptional cohesive strength and is totally water-dispersible when the articles containing the adhesive are recycled, even after being cured by ultraviolet radiation. The present adhesive composition is easily dispersed in water and removed from the fibers of paper, wood pulp or plastics used in disposable products.

U.S. Pat. No. 5,543,488, incorporated herein in its entirety, discloses a branched water dispersible adhesive polyester composition which is easily applied to substrates as a liquid and is completely repulpable, but not capable of cross-linking upon exposure to ultraviolet radiation. Since disclosed crosslinked adhesive polyesters are non-dispersible in water (See U.S. Pat. No. 4,073,777), the applicants were surprised to discover that the addition of unsaturated mono- or dicarboxylic acid moieties to the polyester composition of U.S. Pat. No. 5,543,488 would produce a radiation crosslinkable composition which, when radiation cured, forms a crosslinked polymer film which is dispersible in water during recycling of the adhesive-containing article of manufacture. Since crosslinking impairs the dispersibility of polymers due to the high molecular weight of a new molecule formed by crosslinking a plurality of polymers, and the resulting higher viscosity thereof, it was unexpected that the crosslinking which occurred upon irradiation, which significantly increased the cohesive strength of the adhesive, would still permit the adhesive to be dispersible in water.

The water-dispersible adhesive composition according to the present invention is a branched water-dispersible radiation curable polyester made of the residues or moieties of reaction products; (I); (II); (III); (IV); (V) and (VI) above.

The sulfonate-containing, water-dispersible, adhesives and polyesters of this invention comprise polyesters having repeating, alternating residues or moieties of one or more polycarboxylic acids (at least two acid groups) and one or more polyols (at least two hydroxyl groups) or a combination of one or more polyols and one or more polyamines wherein the mole percentages are based on 100 mole percent polycarboxylic acid residues and 100 mole percent polyol or polyol and polyamine residues, for a total of 200 mole percent. Specifically, the polyesters of this invention comprise polyesters having repeating, alternating residues or moieties of one or more dicarboxylic acid which is not a sulfomonomer, a sulfomonomer, a branching monomer, an unsaturated mono- or dicarboxylic acid monomer and one or more diols or a combination of one or more diols and one or more diamines wherein the molar percentages are based on 100 mole percent dicarboxylic acid residues and 100 mole percent diol or diol and diamine residues, for a total of 200 mole percent. Alternatively, the poly-esters can include residues of monomers having mixed functionality such as hydroxycarboxylic acids, amino-carboxylic acids and/or aminoalkanols.

Examples of suitable difunctional dicarboxylic acid monomers used to make the residue of (I) include aliphatic dicarboxylic acids, alicyclic dicarboxylic acids, aromatic dicarboxylic acids, or mixtures of two or more of these acids. Examples of preferred suitable dicarboxylic acids include succinic; glutaric; adipic; azelaic; sebacic; 1,4-cyclohexanedicarboxylic; 1,3-cyclohexanedicarboxylic; phthalic; terephthalic; and isophthalic. If terephthalic acid is used as the dicarboxylic acid component of the polyester, superior results are achieved when at least 5 mole percent of one of the other acids is also used. It should be understood that the use of the corresponding acid anhydrides, esters, and acid chlorides, or a mixture thereof, of these acids is included in the term "dicarboxylic acid" throughout this application.

The difunctional sulfo-monomer component of (II) is preferably a dicarboxylic acid or ester thereof containing a metal sulfonate group or a glycol containing a metal sulfonate group or a hydroxy acid containing metal sulfonate group. The difunctional monomer component may be either a dicarboxylic acid or a diol adduct containing a —$SO_3M$ group.

The cation of the sulfonate salt can be $NH_4^+$ and any other amine such as dimethylethanolamine and morpholine, or the metal ions $Li^+$, $Na^+$, $K^+$, $Rb^+$, $Cs^+$ and $NH_4^+$, $Li^+$, $Na^+$, and $K^+$, when stability in water is desired.

The —$SO_3M$ group is attached to an aromatic nucleus, examples of which include benzene, naphthalene, anthracene, diphenyl, oxydiphenyl, sulfonyldiphenyl, and methylenediphenyl, with benzene being preferred.

The cationic portion of a nonmetallic sulfonate group optionally present in reactant (II) is a nitrogen-based cation derived from nitrogen-containing bases which may be aliphatic, cycloaliphatic or aromatic basic compounds that have ionization constants in water at 25° C. of $10^{-3}$ to $10^{-10}$, preferably $10^{-5}$ to $10^{-8}$. Especially preferred nitrogen-containing bases are ammonia, dimethylethanolamine, diethanolamine, triethanolamine, pyridine, morpholine, and piperidine, due to availability, cost and usefulness. Such nitrogen-containing bases and cations derived therefrom are described in U.S. Pat. No. 4,304,901, the disclosure of which is incorporated herein by reference in its entirety.

The sulfomonomer (II) is present in a concentration of about 2 to 30 mole percent. However, it is preferred that reactant (II) be present in a concentration of about 4 to 15 mole percent, more preferably about 6 to 12 mole percent, with a mole percent of about 8 being most preferred based on total acid equivalents. At amounts below 2, and in most instances below 4 mole percent the polyester is less repulpable whereas at amounts above 30 mole percent the polyester is too water-sensitive.

Examples of preferred diols of (III) (A), due to availability, include diethylene glycol, triethylene glycol, and mixtures thereof. The preferred concentration of (III) (A) is about 10 to 80 mole percent, however, when these are the preferred diols of (III) (A) the concentration is about 20 to 80 mole percent. At amounts outside this range of 20 to 80 the polyesters have lower softening points or higher Tg than what is most desired.

The moieties of (III) (A) can be the same as (III) (B) when the value n is low. However, it is preferred that (B) be a different moiety and be a poly(ethylene glycol) wherein n is 5 to 50, having a concentration of about 0.1 to 10 mole percent. Examples of suitable poly(ethylene glycols) of (III) (B) include relatively high molecular weight polyethylene glycols, some of which are available commercially under the designation "Carbowax", a product of Union Carbide. Poly (ethylene glycols) having molecular weights of from about 500 to about 5000 are especially suitable.

The moieties of (B) are preferably at a concentration of about 1 to 5 mole percent, particularly when n is 10 to 30, due to the preferably higher softening points. The remaining portion of the glycol component of (III), which is C, can consist of aliphatic, alicyclic, and aralkyl glycols. Examples of these glycols include neopentyl glycol; ethylene glycol; propylene glycol; 1,3-propanediol; 2,4-dimethyl-2-ethyl-hexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol and neopentyl glycol. Copolymers may be prepared from two or more of the above glycols. Preferred glycols, due to availability, cost and usefulness, include neopentyl glycol, ethylene glycol, 1,3-propane diol, 1,4-butane diol, 1,6-hexane diol and cyclohexane dimethanols. The most preferred glycol is cyclohexane dimethanol.

Advantageous examples of difunctional monomer components of (III) which are diamines include ethylenediamine; hexamethylenediamine; 2,2,4-trimethylhexamethylenediamine; 4-oxaheptane-1,4-diamine, 4,7-dioxadecane-1,10-diamine; 1,4-cyclohexanebismethylamine; 1,3-cyclohexanebismethylamine; heptamethylenediamine; dodecamethylenediamine, etc.

The amount of the moieties III (C) present in the polyester is preferably a minor amount up to about 99 (i.e. 99.8) mole percent, more preferably 20 to 80 mole percent with a mole percent of about 30 to 70 being more preferred due to the preferred balance between the desired low Tg and the desired high softening point.

Related branched water-dispersible polyesters are disclosed in U.S. Pat. No. 5,218,042, the disclosure of which is incorporated herein by reference in its entirety. U.S. Pat. No. 5,218,042 is directed towards increasing the stability of dispersions in water and thus endcaps the acid groups or forms a diol adduct of a dicarboxylic sulfomonomer to maintain dispersion stability. However, the present inventive compositions are not directed towards maintaining a stable emulsion, simply producing an emulsion by pulping and dispersing the hot-melt adhesive in water until it is separated from the fibers.

Advantageous difunctional components which are aminoalcohols or aminoalkanols include aromatic, aliphatic, heterocyclic, and other types in regard to component (IV).

Specific examples include 5-aminopentanol-1, 4-aminomethylcyclohexanemethanol, 5-amino-2-ethylpentanol-1, 2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —CR$_2$—OH group.

Advantageous difunctional monomer components which are aminocarboxylic acids include aromatic, aliphatic, heterocyclic, and other types in regard to component (IV) and include lactams. Specific examples include 6-aminocaproic acid, its lactam known as caprolactam, omega aminoundecanoic acid, 3-amino-2-dimethylpropionic acid, 4-(β-aminoethyl)benzoic acid, 2-(β-aminopropoxy)benzoic acid, 4-aminomethylcyclohexanecarboxylic acid, 2-(β-aminopropoxy)cyclohexanecarboxylic acid, etc. Generally, these compounds contain from 2 to 20 carbon atoms.

These moieties (IV) are less preferred, due to cost and performance, but they can be present. The concentration of these moieties is preferably below 20 mol percent, more preferably below 10 mol percent including zero. Therefore, endcapping and forming a diol adduct of the sulfomonomer is not a requirement for the present invention.

The polyester compositions are branched by virtue of the presence of a multifunctional reactant (V) that contains at least three functional groups selected from hydroxyl, carboxyl, and amino. Examples of preferred multifunctional reactants of (V) are trimethylpropane (TMP), trimethylolethane (TME), glycerine, pentaerythritol, erythritol, threitol, dipentaerythritol, sorbitol, trimellitic anhydride, pyromellitic dianhydride, and dimethylolpropionic acid with TMP being most preferred, due to availability and effective results.

The amount of this branching agent (V) is preferably below 20 mole percent, more preferably below 10 mole percent, (including the range for (V) of 0.5 to 10), with a concentration of about 1 to 7 or 2 to 6 mole percent being most preferred. At very high amounts of branching agent the polyester is prone to gelation whereas at low amounts, such as below 0.5 and 0.1, the polyester has poorer performance properties.

The polyester compositions are crosslinkable by ultraviolet radiation due to the presence of —C=C— unsaturation of (VI) in the polymer chain. This unsaturation is provided by the presence in the reaction mixture of about 0.1 to 20 mole percent of an unsaturated mono- or dicarboxylic acid, anhydride, or diester, preferably 0.2 to 10, more preferably 1 to 6 mole percent. A concentration of unsaturated moieties of at least 0.1 mole percent is required in order to have an adequate amount of crosslinking upon irradiation. If more than 20 mole percent of unsaturated moieties is present, the cured adhesive will lose its repulpability character due to too much crosslinking. However, one could adjust the curing conditions to reduce the amount of curing obtained to avoid excess crosslinking. The preferred unsaturated moieties are fumaric acid, maleic anhydride and itaconic acid. Maleic anhydride is most preferred due to its availability.

The polyesters according to the present invention preferably have at least 50 weight percent of the linking groups linking the moieties of the monomeric units being ester linkages, more preferably at least 90 weight percent, with an ester linkage weight percent of 100 being most preferred.

The water-dispersible polyesters described herein have an inherent viscosity of at least 0.1 dL/g, preferably about 0.2 to 0.5 dL/g, measured in a 60/40 parts by weight solution of phenoltetrachloroethane at 25° C. and at a concentration of about 0.25 g of polymer in 100 ml of solvent.

The final uncured adhesive compositions preferably have a number average molecular weight of about 2,000 to 20,000 more preferably about 3,000 to 10,000. Although it is desirable to have as high a molecular weight as possible to achieve the maximum physical properties, such as tensile strength and peel strength, the melt viscosity also increases as molecular weight increases. Therefore, at very high molecular weights the melt viscosity is too high for many useful applications. Both the cured and uncured adhesive compositions are "pressure sensitive," meaning that the adhesive is sticky or tacky at room temperature, due to its low molecular weight.

The preferred Tg (glass transition temperature) of the uncured adhesive composition according to the present invention is below 10° C. and more preferably varies from about 4° to –20° C., with a Tg of about 4° to –13° C. being most preferred. The Tg of the adhesive compositions of the present invention are preferably as low as possible. Thus Tgs below 4° C. and even below 0° C. are preferred. Tgs of greater than 0° C. have generally higher ring and ball softening (RBSP) and heat resistance but are not flexible. A low Tg means that the adhesive compositions will not be brittle, thus, cartons adhered together with the adhesive compositions of the present invention when impacted, even at extremely cold temperatures will not shatter and thus maintain adhesion. However, extremely low Tgs are not easily obtained or at least not easily obtained without greatly affecting some other property, such as lowering the RBSP.

The viscosity of a base polyester is typically measured by the inherent viscosity (dL/g). However, for suitability standards in the adhesives industry, the base polymer and additives are measured in units of centipoises for determining compatibility with the generally used equipment. The hot melt adhesive composition according to the present invention preferably has a viscosity of about 1,500 to about 30,000 centipoises at 1770° C., more preferably about 3,000 to 15,000 centipoises at 1770° C.. The radiation cured composition can have a viscosity of about 20,000 centipoises to gelation at 1770 ° C..

The ring and ball softening point (RBSP) of the adhesive composition of the present invention is preferably at least 80° C., more preferably 80° to 100° C. This high RBSP is good since at higher storage temperatures delamination will not occur in the laminated products and taped products will not become untaped. The RBSP of the radiation cured composition is preferably about 125° to 145° C.

The adhesive compositions according to the present invention are particularly useful due to their good combination of properties and are suitable for use as adhesives for a variety of substrates such as paper, paperboard, cardboard, wood pulp, a variety of plastics including vinyl, polyethylene, PVC and PET, metals such as cold rolled steel, galvanized steel or aluminum and polyolefin films. Some of the recyclable articles of manufacture which would benefit from this invention include heavy duty duct tape, electrical tape, extra heavy cardboard boxes, polyethylene to paperboard laminates, paper bags that have polyethylene liners, nonwoven assemblies, paper products, and wood pulp. Since the adhesive is pressure sensitive, it is especially useful in products which are made to be applied with pressure, such as tapes, labels, bandages, decals and bumper stickers. The hot melt adhesives according to the present invention are repulpable and improved over existing repulpable hot melt adhesive compositions in that the temperature sensitivity, stability on storage, shear strength, tensile strength and cold flow resistance are improved upon curing with radiation.

The adhesive composition according to the present invention can be applied in liquid form as a dispersion in an aqueous solution or other solvent at a concentration of about 10 to 70 weight percent with the remainder being solvent or water or mixtures thereof. Surfactants and other additives can also be present to aid in the dispersibility of the adhesive composition. When applied as a dispersion, the adhesive compositions are generally applied by conventional processes, such as extrusion coating, spray coating, roll coating, brush coating, dip coating, etc.

The adhesive composition according to the present invention is preferably used as a hot melt adhesive. The hot melt adhesive composition is preferably applied in the melt at a temperature of about 150° to 200° C. to a surface of a substrate.

To make a pressure-sensitive adhesive article such as a tape, sticker, decal or adhesive bandage, the adhesive composition according to the present invention is applied to at least one surface of a substrate, such as vinyl. Then, upon setting, the adhesive layer is treated with ultraviolet radiation forming a crosslinked pressure-sensitive adhesive article.

To make a layered laminate, the adhesive composition according to the present invention is applied to one substrate with a second substrate being placed on top of the adhesive forming an article having the adhesive laminated between two substrates. At least one of the substrates must be permeable to ultraviolet radiation. After setting, the adhesive is then cross-linked in place by ultraviolet radiation. Alternatively, the second substrate can be applied after crosslinking the adhesive-coated first substrate, due to the pressure sensitivity of the adhesive. This alternative method would be especially useful in cases where both substrates are impermeable to ultraviolet radiation.

The adhesive composition according to the present invention can also contain standard additives including stabilizers, preferably about 0.1 to about 0.5 weight percent stabilizers. Suitable stabilizers include the antioxidant type and generally consist of sterically hindered phenols, or sulfur or phosphorous substituted phenols. An especially useful antioxidant is Irganox 1010 (from Ciba-Geigy, Hawthorne, NY) which is a pentaerythritol tetrakis-3(3,5-di-tertiarybutyl-4-hydroxyphenyl)propionate.

Additional additives can be added to raise and lower Tg and RBSP. These include, for example, elastomers, plasticizers, extending oils, low molecular weight polyolefins, resins, and tackifiers. Although elastomers can be added to the polyester composition, the presence of such elastomers may be adverse to certain desired properties of the composition. Therefore, it is preferable that the composition of the present invention contain substantially no elastomer. Additionally, the plasticizers such as DOP, DOTP, phenols, glycols, phthalate esters and the like that can be added, can distract from the heat resistance of the final composition lowering the RBSP of both the uncured and cured composition.

Other additives such as nucleating agents, colorants, pigments, solvents, and fillers can be present in small amounts as needed and known in the adhesive industry.

Tackifiers can be added to the polyester composition to prevent cold flow and increase the softening point. Tackifiers provide more stickiness or tack. Since the present adhesive is pressure-sensitive due to its having a low molecular weight, tackifiers may not be required for adequate adhesion. Tackifiers are typically selected from at least one of the groups consisting of hydrocarbon resins, synthetic polyterpenes, functional copolymers, and rosin esters. Hydrocarbon resins are disclosed in U.S. Pat. No. 3,850,858 and functional copolymers, such as styrene-co-maleic anhydride, are well known in the art. Hydrocarbon resins, prepared according to U.S. Pat. No. 3,701,760, polyterpenes, and rosin esters can be used alone or in combinations. These tackifying resins which preferably have softening points of at least 100° C. and most preferably 120° C., can be used in amounts of about 10% to 50% by weight of the adhesive composition, preferably about 25% to 40% by weight. Suitable resins and rosin esters are the terpene polymers having a suitable ring and ball softening point such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut of fraction, and various other terpenes. Commercially available resins of the terpene type include the Zonarez terpene B-series and 7000 series from Arizona Chemical. Also included are the rosin esters with acid numbers above 5 such as the Zonatac resins from Arizona Chemical. Particularly useful materials are terpene mixtures containing a mixture of sulphate terpene, and at least 20% of at least one other terpene selected from the group consisting of pinene, limonene, or dipentene.

These adhesive compositions can also be modified to increase the RBSP and reduce cold flow by including additives such as precipitated calcium carbonates and silicas such as fumed silica. A suitable fumed silica comes from Cabot Corp. as CABOSIL.

The present copolyester composition can be modified with random or alternating styrenic copolymers useful in the compositions of this invention and may be prepared by any of the several methods available for their synthesis. For example, the copolymers may be obtained by solution copolymerization directly from the respective monomers by the incremental additions of the more reactive monomer as taught by U.S. Pat. No. 2,971,939 or by a continuous recycle polymerization process described in U.S. Pat. Nos. 2,769,804 and 2,989,517. Suitable commercially available random or alternating copolymers include the "Dylark" styrene/maleic anhydride copolymers. Suitable blocked copolymers for example from Shell Chemical, include Kraton FG-1902X or Kraton FG-1921X linear styrene ethylene-1-butene styrene blocked copolymers. In formulating adhesives or sealants for use herein, the blocked copolymers should be used at levels of 5–20%, preferably 7–12%.

Modified polyolefins suitable for use in the present invention are prepared by reacting a polyolefin with unsaturated polycarboxylic acid, anhydride or esters thereof. In formulating adhesive or sealants for use herein the modified polyolefins should be used in low amounts from 3–15% preferably 5–9%. These modified polyolefins can enhance heat resistance of the composition.

The adhesive composition of this invention can be prepared using one or more modifiers to the branched copolyester, by blending with the polyester at melt temperatures of 177°–200° C. and mixing until a homogeneous mixture is obtained. A cowles stirrer provides effective mixing for these preparations.

The following examples are intended to illustrate the present invention but are not intended to limit the reasonable scope thereof.

EXAMPLES

Crosslinking is achieved upon irradiation with ultraviolet light. It is preferred that the ultraviolet light used have a wavelength between about 280 and 360 nm, most preferably 320 nm. As an example of the present invention, the applicants coated a 3-inch by 6-inch piece of vinyl with a 2 mil layer of the hot melt adhesive composition. The vinyl was passed through an ultraviolet oven emitting radiation of 340 nm for thirty seconds. The ultraviolet oven used contained six 10-inch 200 watt per inch microwave-energized mercury lamps which were positioned with parabolic reflectors in a geometry to force maximum illumination to the adhesive layer of the laminate. The ultraviolet oven operated at a temperature of 110° F. due to the heat from the ultra-violet lamps. About 150 to 350 watts per inch mercury lamps are preferred, with 300 watts per inch being most preferred.

Examples 1–3 illustrate three different formulations of the present invention. These three examples demonstrate that a variety of monomers can be used to incorporate the unsaturation in the adhesive composition.

Example 1—Preparation of Branched Radiation Curable Water-Dispersible Polyester using Trans-Stilbenedicarboxylic Acid for Unsaturation.

A 1000 mL round bottom flask equipped with a ground-glass head, agitator shaft, nitrogen inlet, and a sidearm was charged with 140.0 grams (0.70 mole) of trans-1,4-dimethylcyclohexanedicarboxylate, 59.2 grams (0.20 mole) trans-stilbenedicarboxylic acid, 29.60 grams (0.10 mole) dimethyl-5-sodiosulfoisophthalate, 95.4 grams (0.90 mole) diethylene glycol, 43.20 grams (0.30 mole) 1,4-cyclohexanedimethanol, 6.70 grams (0.05 mole) trimethylol propane, and 1.28 mL (50 ppm) of 1.46% (W/V) solution of titanium isopropoxide in n-butanol. The flask was purged with nitrogen and immersed in a Belmont metal bath at 200° C. for 90 minutes and 220° C. for an additional 90 minutes under a slow nitrogen sweep with sufficient agitation. After elevating the temperature to 280° C., a vacuum <=0.5 mm was installed for 15 minutes to perform the polycondensation. The vacuum was then displaced with a nitrogen atmosphere and the polymer was allowed to cool after removing the flask from the metal bath.

An inherent viscosity of 0.16 dL/g was determined for the recovered polymer according to ASTM D3835-79 and a glass transition temperature of 15° C. was obtained from thermal analysis by DSC.

Example 2—Preparation of Branched Radiation Curable Water-Dispersible Polyester using Maleic Anhydride for Unsaturation.

A 1000 mL round bottom flask equipped with a ground-glass head, agitator shaft, nitrogen inlet, and a sidearm was charged with 160.0 grams (0.80 mole) of trans-1,4-dimethylcyclohexanedicarboxylate, 9.8 grams (0.10 mole) maleic anhydride, 29.60 grams (0.10 mole) dimethyl-5-sodiosulfoisophthalate, 95.4 grams (0.90 mole) diethylene glycol, 43.20 grams (0.30 mole) 1,4-cyclohexanedimethanol, 6.70 grams (0.05 mole) trimethylol propane, and 1.18 mL (50 ppm) of 1.46% (W-V) solution of titanium isopropoxide in n-butanol. The flask was purged with nitrogen and immersed in a Belmont metal bath at 200° C. for 90 minutes and 220° C. for an additional 90 minutes under a slow nitrogen sweep with sufficient agitation. After elevating the temperature to 280° C., a vacuum <=0.5 mm was installed for 15 minutes to perform the polycondensation. The vacuum was then displaced with a nitrogen atmosphere and the polymer was allowed to cool after removing the flask from the metal bath.

An inherent viscosity of 0.25 dL/g was determined for the recovered polymer according to ASTM D3835-79 and a glass transition temperature of 3° C. was obtained from thermal analysis by DSC. The clear polymer was stabilized with 0.3 grams of Irganox 1010.

Example 3—Preparation of Branched Water-Dispersible Polyester using 2-Carboxy Cinnamic Acid for Unsaturation.

A 1000 mL round bottom flask equipped with a ground-glass head, agitator shaft, nitrogen inlet, and a sidearm was charged with 160.0 grams (0.80 mole) of trans-1,4-dimethylcyclohexanedicarboxylate, 19.2 grams (0.10 mole) 2-carboxy cinnamic acid, 29.60 grams (0.10 mole) dimethyl-5-sodiosulfoisophthalate, 95.4 grams (0.90 mole) diethylene glycol, 43.20 grams (0.30 mole) 1,4-cyclohexanedimethanol, 6.70 grams (0.05 mole) trimethylol propane, and 5.98 mL (50 ppm) of 0.296% (W/V) solution of titanium isopropoxide in n-butanol. The flask was purged with nitrogen and immersed in a Belmont metal bath at 200° C. for 90 minutes and 220° C. for an additional 90 minutes under a slow nitrogen sweep with sufficient agitation. After elevating the temperature to 280° C., a vacuum <=0.5 mm was installed for 15 minutes to perform the polycondensation. The vacuum was then displaced with a nitrogen atmosphere and the polymer was allowed to cool after removing the flask from the metal bath.

An inherent viscosity of 0.18 dL/g was determined for the recovered polymer according to ASTM D3835-79 and a glass transition temperature of 7° C. was obtained from thermal analysis by DSC. The number average molecular weight, as determined by Gel Permeation Chromatography (GPC), was 7,800. The clear polymer was stabilized with 0.3 grams of Irganox 1010. The properties of this resin are illustrated in Table 1.

Example 4—Preparation of Branched Water-Dispersible Polyester using 2-Carboxy Cinnamic Acid for Unsaturation.

This example, when compared to Example 3, illustrates the effect of dividing the molar amount of the unsaturated monomer in the adhesive composition. There was no significant physical difference in the uncured compositions of Example 3 and Example 4.

A 1000 mL round bottom flask equipped with a ground-glass head, agitator shaft, nitrogen inlet, and a sidearm was charged with 170.0 grams (0.85 mole) of trans-1,4-dimethylcyclohexanedicarboxylate, 9.6 grams (0.05 mole) 2-carboxy cinnamic acid, 29.60 grams (0.10 mole) dimethyl-5-sodiosulfoisophthalate, 95.4 grams (0.90 mole) diethylene glycol, 43.20 grams (0.30 mole) 1,4-cyclohexanedimethanol, 6.70 grams (0.05 mole) trimethylol propane, and 5.99 mL (50 ppm) of 0.296% (W/V) solution of titanium isopropoxide in n-butanol. The flask was purged with nitrogen and immersed in a Belmont metal bath at 2000° C. for 90 minutes and 220° C. for an additional 90 minutes under a slow nitrogen sweep with sufficient agitation. After elevating the temperature to 280° C., a vacuum <=0.5 mm was installed for 15 minutes to perform the polycondensation. The vacuum was then displaced with a nitrogen atmosphere and the polymer was allowed to cool after removing the flask from the metal bath.

An inherent viscosity of 0.19 dL/g was determined for the recovered polymer according to ASTM D3835-79 and a glass transition temperature of 6° C. was obtained from thermal analysis by DSC. The number average molecular weight, as determined by Gel Permeation Chromatography (GPC), was 8,200. The clear polymer was stabilized with 0.3 grams of Irganox 1010. The properties of this resin are illustrated in Table 1.

Example 5—Physical Properties of Radiation Crosslinked Branched Water-Dispersible Polyesters.

This example illustrates the physical changes which take place when the present adhesive composition is cured with ultraviolet radiation. After crosslinking, the molecular weight, viscosity, RBSP, tensile strength and shore A hardness of the adhesive significantly increase. The crosslinked composition is still dispersible in water, although not as quickly as the uncured composition.

This example also illustrates the physical differences in the uncured and cured composition using half the molar amount of the unsaturated monomer. The sample composition from Example 3 had one half of the percentage of the unsaturated moiety, 2-carboxy cinnamic acid, as did the sample composition from Example 4. The data in Table I shows that higher percentage of unsaturation produced an adhesive having a higher viscosity and higher tensile strength, for both the cured and uncured samples. The data also show that the higher unsaturation cured sample was still dispersible but less so.

In order to achieve optimum crosslinking of the polymers of Example 3 and Example 4, 0.2% of a crosslinking agent, Irgacure 184 (1-hydroxycyclohexylphenyl ketone)—Ciba Geigy, was added to the polymers before irradiation. The addition of the Irgacure 184 did not alter the stability of the polymers or their measured physical properties until exposure to ultraviolet radiation.

Pieces of 30# kraft paper were taped to 3-inch by 8-inch panels of stainless steel. The polymers of Example 3 and Example 4 were coated onto the paper by using a Meyer rod to achieve a 1 mil drawdown. These samples were then run through an ultraviolet coater for a total exposure time of 180 seconds at 300 wpi (watts per inch) and 20 rpm (revolutions per minute).

Two 6-inch by 6-inch pieces of these coated paper samples were laminated together by contacting the two adhesive surfaces together immediately after curing and thereafter bonding by passing a 1-pound weight over the laminate. They displayed fiber tear when pulled apart.

When 5 grams of the coated paper sample was placed in 100 mL tap water, the adhesive completely dispersed in the water within 1 hour. This one hour test has previously been shown to be consistent with good repulpability.

These test results are shown in Table I.

TABLE I

| Test | Uncured Polymers | | Cured Polymers | |
|---|---|---|---|---|
| | Ex. 3 | Ex. 4 | Ex. 3 | Ex. 4 |
| Viscosity 177° C. (cps) | 6810 | 5110 | gel | 23,000 |
| Viscosity 190° C. (cps) | 4910 | 3910 | gel | 18,800 |
| Ring and Ball Softening Point (°C.) | 83 | 83 | 141 | 128 |
| Tensile Strength (MPa) | .28 | .12 | .40 | .46 |
| Elongation (%) | 328 | 546 | 361 | 338 |
| Shore A Hardness (×0.1 mm) | 38–45 | 35–40 | 80+ | 70–80 |
| Water Dispersibility 1 gram in 100 mL of tap water (minutes) | 30 | 30 | 45–60 | 30 |
| Kraft Tear .0254 mm adhesive | OK | OK | OK | OK |

Viscosity-ASTM D3236
Ring and Ball Softening Point-ASTM E28
Tensile Strength-ASTM D412 (mega pascal units)
Elongation-ASTM D412
Shore A Hardness-ASTM D5
Water Dispersibility-1 gram adhesive in 100 mL tap water with mild agitation.
Kraft Tear-ASTM D1876 T-Peel test.

We claim:

1. A water-dispersible adhesive composition comprising a branched water-dispersible radiation crosslinkable polyester composition, the polyester composition being water dispersible before and after crosslinking and made of the moieties of reaction products;

(I) at least one difunctional dicarboxylic acid which is not a sulfomonomer;

(II) about 2 to 30 mole percent, based on the total of all acid, hydroxyl and amino equivalence, of residues of at least one difunctional sulfomonomer containing at least one sulfonate group bonded to an aromatic ring wherein the functional groups are hydroxyl or carboxyl;

(III) at least one diol or a mixture of diol and diamine comprising:
  (A) about 0.1 to 85 mole percent, based on the total mole percent of diol and diamine moieties, of a diol and diamine having the formula H(—OCH$_2$CH$_2$—)$_n$OH and HRN((CH$_2$CH$_2$O))$_n$NHR wherein n is 1 to about 20 and R is hydrogen or C$_1$–C$_6$ alyl provided that the mole percent of such moieties is inversely proportional to the value of n;
  (B) about 0.1 to about 15 mole percent, based on the total mole percent of diol moieties, of moieties of a poly-(ethylene glycol) having the formula H(—OCH$_2$CH$_2$—)$_n$OH wherein n is 2 to about 500, provided that the mole percent of such moieties is inversely proportional to the value of n; and
  (C) 0 to about 99 mole percent of the diol component being selected from the group consisting of a glycol containing two —C(R')$_2$—OH groups wherein R' in the reactant is a hydrogen atom, an alkyl of 1 to 5 carbon atoms, or an alkyl group of 6 to 10 carbon atoms;

(IV) 0 to about 40 mole percent of a di functional monomer reactant selected from the group consisting of hydroxycarboxylic acids having one —C(R—)$_2$—OH group, aminocarboxylic acids having one —NRH group, and mixtures of said difunctional reactants wherein R in the reactant is hydrogen or an alkyl group of I to 6 carbon atoms;

(V) about 0.1 to 40 mole percent of a multifunctional reactant containing at least three functional groups selected from hydroxyl, carboxyl, amino and mixtures thereof; and (VI) about 0.1I to 20 mole percent of an unsaturated mono- or dicarboxylic acid;

wherein the moieties of (I), (II), (III), (IV) and (V) are aliphatic, cycloaliphatic or aromatic, wherein the polymer contains substantially equal molar proportions of acid equivalents (100 mole percent) and diol or diol and diamine equivalents (100 mole percent), wherein all stated mole percents are based on the total of all acid, hydroxyl, and amino group containing reactants being equal to 200 mole percent, and wherein the polymer contains a portion of the acid-group containing reactants (100 mole percent acid) to hydroxyl and amino-group containing reactants (100 mole percent), wherein at least 20 weight percent of the groups linking the moieties of the monomeric units are ester linkages, wherein the inherent viscosity is at least 0.1 dL/g measured in a 60/40 parts by weight solution of phenol/tetrachloroethane at 25 ° C. and at a concentration of about 0.25 g of polymer in 100 ml of the solvent, wherein the glass transition temperature T$_g$ is no greater than 20° C., and wherein the ring and ball softening point (RBSP) is at least 70° C.

2. The composition according to claim 1 wherein said difunctional dicarboxylic acid of (I) is selected from the group consisting of succinic acid, glutaric acid, adipic acid, azelaic acid, sebacic acid, fumaric acid, maleic acid, itaconic acid, 1,4-cyclohexanedicarboxylic acid, 1,3-cyclohexanedicarboxylic acid, phthalic acid, terephthalic acid and isophthalic acid and mixtures of two or more of these acids.

3. The composition according to claim 1 wherein said difunctional sulfo-monomer of (II) is in a concentration of about 6 to 12 mole percent and is selected from the group consisting of dicarboxylic acid and ester, containing a metal sulfonate group having a cation selected from the group consisting of hydrogen, amines, $NH_4^+$, $Li^+$, $Na^+$, $^+$, $Rb^+$ and $Cs^+$.

4. The composition according to claim 1 wherein said sulfonate group of (II) is attached to an aromatic ring selected from the group consisting of benzene, naphthalene, anthracene, diphenyl, oxydiphenyl, sulfonyldiphenyl, an methylenediphenyl.

5. The composition according to claim 1 wherein the diol moieties of (A) are in a concentration of about 20 to 80 mole percent and the moieties of (A) are selected from the group consisting of diethylene glycol, triethylene glycol and mixtures thereof.

6. The composition according to claim 1 wherein the component (A) and (B) of (III) are different moieties and the moieties of (A) are selected from the group consisting of diethylene glycol, triethylene glycol, and mixtures thereof and the moieties of (B) are in a concentration of about 0.1 to 10 mole percent and are selected from poly(ethylene glycols) wherein n is 5 to 50.

7. The composition according to claim 1 wherein the moieties of component (C) of (III) are present in a concentration of about 30 to 70 mole percent and are selected from the group consisting of neopentyl glycol, ethylene glycol, 1,3 propane diol, 1,4 butane diol, 1,6 hexane diol and cyclohexane dimethanol.

8. The composition according to claim 1 wherein the moieties of (V) are present in a concentration of about 0.1 to 20 mole percent and are selected from the group consisting of trimethylpropane, trimethylolethane, glycerine, pentaerythritol, erythritol, threitol, dipentaerythritol, sorbitol, trimellitic anhydride, pyromellitic dianhydride, and dimethylolpropionic acid.

9. The composition according to claim 1 wherein the unsaturated moiety of (VI) is present in a concentration of about 1 to 6 mole percent and is selected from the group consisting of fumaric acid, maleic anhydride and itaconic acid.

10. The composition according to claim 1 wherein at least 90 weight percent of the groups linking the moieties of the monomeric units are ester linkages.

11. The composition according to claim 1 wherein the number average molecular weight of the polyester composition is between 3,000 and 10,000 prior to cross-linking.

12. The composition according to claim 1 wherein the $T_g$ is less than 4° C. prior to crosslinking.

13. The composition according to claim 1 wherein the ring and ball softening point of the composition is 80° to 100° C. prior to crosslinking and about 125° to 145° C. after crosslinking.

14. The composition according to claim 1 wherein the viscosity of the composition is about 1,500 to 30,000 centipoise at 177° C. prior to crosslinking and about 20,000 to gelation at 177° C. after crosslinking.

15. An article of manufacture comprising the adhesive composition of claim 1 laminated between two substrates.

16. An article of manufacture comprising the adhesive composition of claim 1 laminated between two substrates, wherein said adhesive composition is crosslinked.

17. An article of manufacture comprising the adhesive composition of claim 1 laminated onto at least one surface of a substrate.

18. An article of manufacture comprising the adhesive composition of claim 1 laminated onto at least one surface of a substrate, wherein said adhesive composition is crosslinked.

19. A process comprising applying in liquid form to a surface of a substrate the water-dispersible adhesive composition of claim 1, applying a second surface of a substrate to the water dispersible adhesive composition, wherein at least one of said substrates is permeable to ultraviolet radiation, thereby forming a laminate and thereafter treating said laminate with ultraviolet radiation thereby forming a crosslinked laminate.

20. A process comprising applying in liquid form to at least one surface of a substrate the water-dispersible adhesive composition of claim 1 and thereafter treating said laminate with ultraviolet radiation thereby forming a crosslinked pressure-sensitive adhesive article.

21. The process according to claim 20 further comprising pressureably applying a second substrate to said adhesive composition of said crosslinked pressure-sensitive adhesive article, thereby forming a cross-linked laminate.

22. A process comprising applying in liquid form to at least one surface of a first substrate a water-dispersible adhesive composition comprising a branched water-dispersible radiation crosslinkable polyester composition, the polyester composition being water dispersible before and after crosslinking and made of the moieties of reaction products;

(I) at least one difunctional dicarboxylic acid which is not a sulfomonomer;

(II) about 2 to 30 mole percent, based on the total of all acid, hydroxyl and amino equivalence, of residues of at least one difunctional sulfomonomer containing at least one sulfonate group bonded to an aromatic ring wherein the functional groups are hydroxyl or carboxyl;

(III) at least one diol or a mixture of diol and diamine comprising:

(A) about 0.1 to 85 mole percent, based on the total mole percent of diol and diamine moieties, of a diol and diamine having the formula $H(—OCH_2CH_2—)_nOH$ and $HRN((CH_2CH_2O))_nNHR$ wherein n is 2 to about 20 and R is hydrogen or $C_1$-$C_6$ alkyl provided that the mole percent of such moieties is inversely proportional to the value of n;

(B) about 0.1 to about 15 mole percent, based on the total mole percent of diol moieties, of moieties of a poly(ethylene glycol) having the formula $H(—OCH_2CH_2—)_nOH$ wherein n is 2 to about 500, provided that the mole percent of such moieties is inversely proportional to the value of n; and (C) 0 to greater than about 99 mole percent of the diol component being selected from the group consisting of a glycol containing two —C(R')$_2$—OH groups wherein R' in the reactant is a hydrogen atom, an alkyl of 1 to 5 carbon atoms, or an alkyl group of 6 to 10 carbon atoms;

(IV) 0 to about 40 mole percent of a difunctional monomer reactant selected from the group consisting of hydroxycarboxylic acids having one —C(R—)$_2$—OH group, aminocarboxylic acids having one —NRH group, and mixtures of said difunctional reactants wherein R in the reactant is hydrogen or an alkyl group of 1 to 6 carbon atoms;

(V) about 0.1 to 40 mole percent of a multifunctional reactant containing at least three functional groups selected from hydroxyl, carboxyl, amino and mixtures thereof; and (VI) about 0.1 to 20 mole percent of an unsaturated mono- or dicarboxylic acid;

wherein the moieties of (I), (II), (III), (IV) and (V) are aliphatic, cycloaliphatic or aromatic, wherein the polymer contains substantially equal molar proportions of acid equivalents (100 mole percent) and diol or diol and diamine equivalents (100 mole percent), wherein all stated mole percents are based on the total of all acid, hydroxyl, and amino group containing reactants being equal to 200 mole percent, and wherein the polymer contains a portion of the acid-group containing reactants (100 mole percent acid) to hydroxyl and amino-group containing reactants (100 mole percent), wherein at least 20 weight percent of the groups linking the moieties of the monomeric units are ester linkages, wherein the inherent viscosity is at least 0.1 dL/g measured in a 60/40 parts by weight solution of phenol/tetrachloroethane at 25° C. and at a concentration of about 0.25 g of polymer in 100 ml of the solvent, wherein the glass transition temperature $T_g$ is no greater than 20° C., and wherein the ring and ball softening point (RBSP) is at least 70° C., thereby forming an adhesive article, and thereafter treating said adhesive article with ultraviolet radiation thereby forming a crosslinked adhesive article.

23. The process according to claim 22 wherein the liquid form is in the melt and the adhesive composition is a hot melt adhesive composition that is applied at a temperature of about 150° to 200° C.

24. The process according to claim 22 further comprising applying a surface of a second substrate to the adhesive layer of said adhesive article prior to irradiation wherein at least one of said first and second substrates is permeable to ultraviolet radiation.

25. The process according to claim 24 further comprising repulping said crosslinked laminate in an aqueous pulping solution thereby separating said water-dispersible adhesive composition from said surfaces wherein the composition of at least one of said substrates is a fibrous material.

* * * * *

UNITED STATES PATENT AND TRADEMARK OFFICE
CERTIFICATE OF CORRECTION

PATENT NO. : 5,780,151
DATED : July 14, 1998
INVENTOR(S) : Richard Anthony Miller and Scott Ellery George It is certified that error appears in the above-identified patent and that said Letters Patent is hereby corrected as shown below:

Claim 1, Column 14, Line 14:

"1" should read -- 2 --

Claim 1, Column 14, Line 15:

"alyl" should read -- alkyl --

Claim 1, Column 14, Line 31:

"di functional" should read -- difunctional --

Claim 1, Column 14, Line 37:

"I" should ready -- 1 --

Claim 1, Column 14, Line 42:

"0.1I" should read -- 0.1 --

UNITED STATES PATENT AND TRADEMARK OFFICE
CERTIFICATE OF CORRECTION

PATENT NO. : 5,780,151
DATED : July 14, 1998
INVENTOR(S) : Richard Anthony Miller, et. al.

It is certified that error appears in the above-identified patent and that said Letters Patent is hereby corrected as shown below:

Claim 3, Column 15, Line 10:
"+" should read --, $K^+$, --

Signed and Sealed this

Twenty-second Day of September, 1998

Attest:

BRUCE LEHMAN

Attesting Officer        Commissioner of Patents and Trademarks